C. E. HASTY.
AUTOMATICALLY OPERABLE PRESSURE REGULATING VALVE AND MECHANISM THEREFOR.
APPLICATION FILED DEC. 2, 1911.
1,026,262. Patented May 14, 1912.
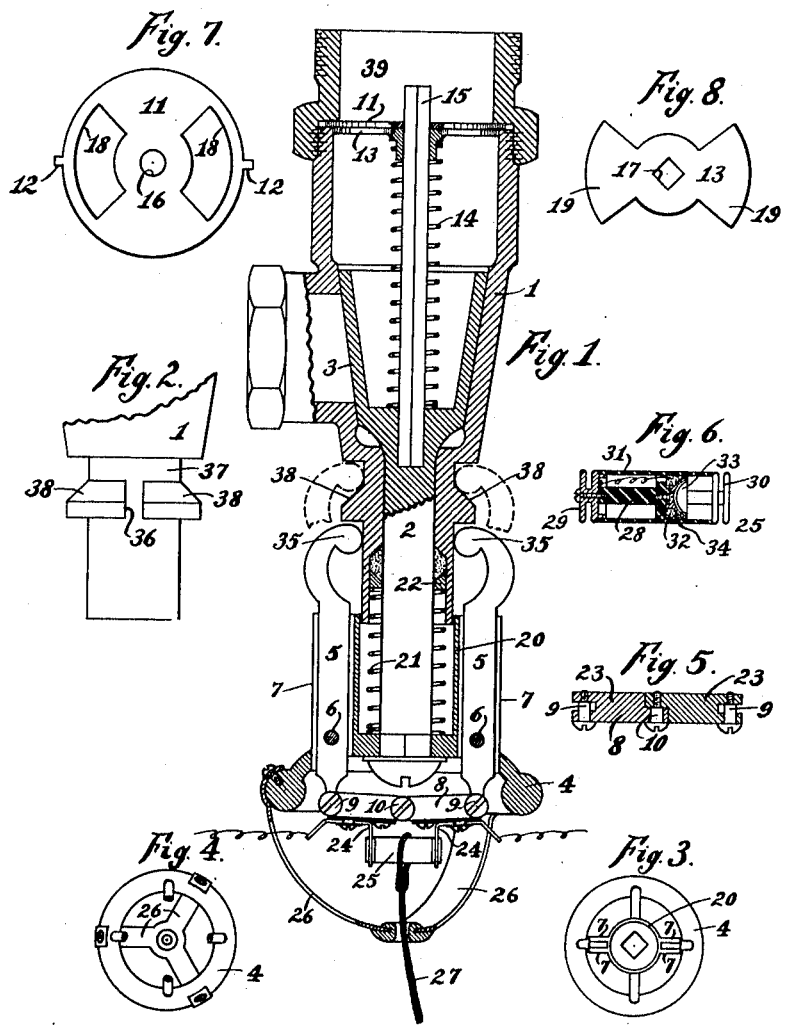
WITNESSES:
Edna Miller
Frances R. Parker
INVENTOR:
Charles Edward Hasty
BY Frederick R. Parker
ATTORNEY.

UNITED STATES PATENT OFFICE.

CHARLES EDWARD HASTY, OF ELGIN, ILLINOIS, ASSIGNOR TO HASTY MANUFACTURING COMPANY, OF ELGIN, ILLINOIS, A CORPORATION OF ILLINOIS.

AUTOMATICALLY-OPERABLE PRESSURE-REGULATING VALVE AND MECHANISM THEREFOR.

1,026,262.     Specification of Letters Patent.     Patented May 14, 1912.

Application filed December 2, 1911. Serial No. 663,550.

*To all whom it may concern:*

Be it known that I, CHARLES EDWARD HASTY, a citizen of the United States of America, residing at Elgin, in the county of Kane and State of Illinois, have invented a new and useful Automatically-Operable Pressure-Regulating Valve and Mechanism Therefor, of which the following is a specification, reference being had to the accompanying drawings, illustrating same.

My invention relates to valves and to mechanisms therefor for causing the operation thereof in various ways, and also to mechanism for regulating the fluid pressure in the fluid passage by means of operating the valve mechanism.

The principal objects of my invention are, to provide improved means for causing the automatic operation of valves by means of heat, electricity, and manually-operable means; to provide improved means in association with such valves for regulating the fluid pressure in the fluid passage by means of operating the valve mechanism; to provide an improved heat-susceptible link and heat cartridge for such valves; and to provide improved constructions in the various parts of the apparatus herein set forth.

Other objects will be apparent from the following specification.

In the accompanying drawings illustrating the preferred form of my invention, Figure 1 is a vertical cross-sectional view of one form of valve of the invention, with portions shown in elevation; Fig. 2 is an elevation of the lower end of the valve casing shown in Fig. 1; Fig. 3 is a plan view of the hand wheel for manually operating the valve, shown in Fig. 1; Fig. 4 is a plan view of a portion of the hand wheel shown in Fig. 3, with the shield shown in Fig. 1 attached; Fig. 5 is a cross-sectional view of the hinged link shown in Fig. 1, showing the construction thereof; Fig. 6 is a longitudinal cross-sectional view of the heat cartridge shown in Fig. 1, with portions shown in elevation; and Figs. 7 and 8 are plan views of the respective disks used in connection with the valve of Fig. 1 for automatically regulating the fluid pressure in the fluid passage through the operation of the valve.

Like characters refer to like parts in the several figures.

In some kinds of valves, such as valves located on the main gas supply pipes of buildings, it is very desirable to have excessive heating at the valve, as in the case of fire, automatically close the valve and thus shut off the supply of gas to the building, or to be able to cause the automatic closure of the valve from a distance, either by electricity or manually-operable means. An electrically-operable valve of this character may be automatically operated from a great distance over various fire-alarm or signaling circuits, while a manually-operable valve of this character may be operated by a manually-operable means from a hallway, vestibule, or other suitable place. Thus it can be seen that each of the various modes of operating such valves has its advantages.

In the present invention I have combined all of the above-mentioned features into one valve, thus providing a single valve which has all of the advantages above mentioned. In addition to this I have associated with such a valve a simple and efficient means for regulating the fluid pressure in the fluid passage, this pressure-regulating means being preferably operated and controlled by the manual operation of the valve. The advantages of these various features can be readily understood from the following description.

In the valve illustrated, 1 is the valve casing, 2 is the valve plug which has a tapered portion 3 fitting in a tapered seat in the casing 1, 4 is a hand wheel attached to the lower end of the plug 2 for operating the latter, 5 5 are a pair of arms for holding the valve plug in set or open position, the arms 5 5 being pivoted at 6 6 between wings 7 7 of the hand-wheel member 4 preferably as shown, and 8 is a link hinged at 10 and pivoted to the respective arms 5 5 at 9 9, preferably as shown in Figs. 1 and 5.

Across the upper end of the valve casing 1 is secured a disk 11 preferably as shown, the disk 11 being prevented from turning by the ears 12 12 thereon fitting in corresponding recesses in the end of the casing 1 (not shown). Underneath the disk 11 is placed another disk 13 which is held against the disk 11 by a coil spring 14, the latter encircling a rod 15 which is rigidly secured to the plug 2 preferably as shown. The spring 14 also serves to help seat the plug 2 when the valve is automatically closed, as will be more fully described. The rod 15 extends loosely through a round hole 16 in the center of the disk 11, and through a polygonally-formed hole 17 in the center of the disk 13, the cross-section of the rod 15 being similar to the shape of the hole 17 so that turning the rod 15 causes the disk 13 to turn therewith. The rod 15 is, however, freely movable endwise through both of the disks 11 and 13. The disk 11 is provided with a pair of holes 18 18 therethrough, and the disk 13 is provided with a pair of flat wing portions 19 19 adapted to move underneath the holes 18 18 to open and close the latter when the disk 13 is turned. Thus by turning the disk 13 relatively to the disk 11 the wing portions 19 19 vary the size of the openings 18 18 through the disk 11, which varies the size of the fluid passage at this point and thereby regulates the fluid pressure in the outgoing fluid passage. The wings 19 19 of the disk 13 are preferably made narrower than the openings 18 18 in the disk 11, so that the fluid passage is never entirely closed by the wings 19 19. This pressure-regulating mechanism forms the subject-matter of my co-pending United States application Serial No. 663,552, filed Dec. 2, 1911.

The cup-shaped portion 20 is preferably a part of the hand-wheel member 4 which is rigidly secured to the lower end of the plug 2 preferably as shown. A coil spring 21 is placed in the cup 20 around the lower end of the plug 2. This spring 21 acts between a packing ring 22 and the bottom of the cup 20 to help seat the plug 2 when the valve is automatically closed.

The members 23 23 of the link 8 carry respective contact springs 24 24 which are insulated therefrom. The spring members 24 24 carry a heat cartridge 25 preferably as shown, adapted to be operated by an electric current from any desired locality. To the wheel 4 is secured a shield 26 for protecting the heat cartridge 25 and the link 8. Through the center of the shield 26 extends a cord 27, preferably silk, by means of which the heat-cartridge 25 may be pulled from the spring members 24 24 as desired, from any considerable distance from the valve, to cause the automatic closure of the valve. The heat cartridge 25 is preferably constructed as shown in Fig. 6, in which 28 is an insulating member carrying a metallic terminal 29 on one end thereof and a metallic cup-shaped portion 34 on the other end thereof. Within the cup-shaped portion 34 is soldered a convexly-formed metallic member 33 carrying a terminal portion 30, by an easily-fusible solder between the parts 33 and 34. 32 is a resistance adapted to produce heat when a current of electricity is sent therethrough, for softening the easily-fusible solder between the parts 33 and 34 to permit these parts to separate, the portion 33 then readily coming out of the cup-shaped portion 34.

31 is a sleeve inclosing the interior portions of the heat cartridge but not connected with the terminals 29 and 30. With the convexly-formed portion 33 and the cup-shaped portion 34, the device is always sure to operate when properly heated, as these parts cannot possibly bind or hold on each other. Neither can the part 33 bind or hold on the insulating sleeve 31 when the cartridge operates, on account of the part 33 being made considerably smaller than the sleeve 31.

The operation of the apparatus is as follows: The tapered portion 3 of the plug 2 is raised from its seat to open the valve by first turning the hand wheel 4, with the plug 2, arms 5 5, rod 15 and disk 13, until the upper ends 35 35 of the arms 5 5 are brought directly under the passageways 36 in opposite sides of the casing 1; then raising the hand wheel 4 with the plug 2, arms 5 5 and rod 15, against the tension of the springs 14 and 21 until the ends 35 35 of the arms 5 5 are brought through the passageways 36 into the annular passegeway 37 in the valve casing 1; and then again turning the hand wheel 4 with the plug 2, arms 5 5, rod 15 and disk 13, so that the ends of the arms 5 5 catch on the beveled surfaces 38 38 of the valve casing 1 and thereby hold the valve plug 2 out of its seat against the tension of the springs 14 and 21 which tend to seat the plug 2, this latter turning of the disk 13 relatively to the disk 11 regulating the size of the openings 18 18 through the disk 11 and thereby regulating the fluid pressure in the outlet pipe 39. While the plug 2 is thus out of its seat the hand wheel 4 and the apparatus connected therewith may be turned as desired, to turn the disk 13 relatively to the disk 11 and thereby regulate the fluid pressure as desired.

The valve can be closed manually at any time by simply turning the hand wheel 4 with the apparatus connected therewith until the ends 35 35 of the arms 5 5 are brought directly over the passageways 36 in the valve casing, at which point of the operation the springs 14 and 21 will automatically seat the plug 2 to the position shown in Fig. 1. When, however, it is desired to automatically close the valve, it is necessary to cause the portions 23 23 of the link 8 to move downwardly at the pivot 10, so that the springs 14 and 21 can force the ends 35 35 of the arms 5 5 outwardly and down over the beveled surfaces 38 38 of the casing 1 to the position shown in Fig. 1, thereby seating the plug 2 as well understood. This operation of the link 8 may be caused by excessive heating at the valve, as by a fire near the valve, or by an electric current in the heat cartridge 25 which causes it to give way, or by removing the heat cartridge 25 from the springs 24 24 by means of pulling the pull-cord 27, preferably from a distance from the valve. When the heat cartridge 25 is heated sufficiently, either by fire or electricity, the easily-fusible solder between the parts 33 and 34 is softened, which unsolders the part 33 from the part 34 and thereby permits the springs 24 24 to pull the heat cartridge apart, the convexly-formed portion 33 coming out of the cup-shaped portion 34, in a manner well understood. The springs 24 24 tend to spring apart by the downward action of springs 14 and 21 on the hand-wheel member 4, which action causes the beveled surfaces 38 38 to tend to force the upper ends 35 35 of the arms 5 5 outwardly, and consequently the lower ends of the arms 5 5 inwardly, on the pivots 6 6, thereby tending to force the pivot 10 of the link 8 downwardly and the springs 24 24 outwardly. Thus the operation of the apparatus, caused by the weakening or removal of the heat cartridge 25, can be readily understood.

When it is desired to open the valve after being closed automatically, it is only necessary to place a good heat cartridge 25 in connection with the springs 24 24 as shown in Fig. 1, and then manually open the valve by means of the hand wheel 4 as above described.

I do not wish to limit this invention to all of the particular details herein set forth, as various modifications thereof may be made or utilized without departing from the scope of the appended claims.

What I claim as my invention is:

1. The combination with a valve having mechanism for automatically operating the valve and a heat-susceptible element for normally holding the said mechanism against operation, of electrical means for causing the said heat-susceptible element to release the said mechanism, and means for manually removing the said heat-susceptible element from the said mechanism from a distance, for releasing the latter.

2. The combination with a valve having mechanism for automatically operating the valve and a heat-susceptible element for normally holding the said mechanism against operation, of means for manually removing the said heat-susceptible element from the said mechanism from a distance, for releasing the latter.

3. The combination with a valve having mechanism for automatically operating the valve and a fusible link for normally holding the said mechanism against operation, of electrothermal means for heating the said link to cause the operation of the said mechanism, and a cord for manually removing the said link from the said mechanism from a distance, for releasing the latter.

4. The combination with a valve having mechanism for automatically operating the valve and a fusible link for normally holding the said mechanism against operation, of a cord for manually removing the said link from the said mechanism from a distance, for releasing the latter.

5. A valve having spring mechanism for causing the operation thereof and mechanism for holding the valve in set position against the action of the said spring mechanism, the said holding mechanism comprising a hand wheel, a pair of arms pivoted to the hand-wheel member and coöperating with the valve casing, a jointed link pivoted to the said arms, and an electrothermal device removably connected with the said link for holding the said holding mechanism intact, and a pull-cord attached to the said electrothermal device and operable from a distance from the valve for removing the said device from the said holding mechanism to permit the operation of the valve.

6. A valve having spring mechanism for causing the operation thereof and mechanism for holding the valve in set position against the action of the said spring mechanism, the said holding mechanism having an electrothermal device removably connected therewith for holding it intact, and a pull-cord associated with the said electrothermal device and operable from a distance from the valve for removing the said device from the said holding mechanism to permit the operation of the valve.

7. A valve having means tending to cause the operation thereof and mechanism for holding the valve in set position against the action of the said means, the said mechanism having an electrothermal device removably connected therewith for holding it intact, and means associated with the said electrothermal device and operable from a distance from the valve for removing the said device from the said holding mechanism to permit the operation of the valve.

8. A valve having means tending to cause the operation thereof and mechanism for holding the valve in set position against the action of the said means, the said mechanism having an electrothermal element removably connected therewith for holding it intact, and a pull-cord associated with the said electrothermal element and operable from a distance from the valve for removing the said electrothermal element from the said holding mechanism to permit the operation of the valve.

9. A valve having means tending to cause the operation thereof and mechanism for holding the valve in set position against the action of the said means, the said mechanism having a thermal element removably connected therewith for holding it intact, and manually-operable means associated with the said thermal element and operable from a distance from the valve for removing the said thermal element from the said holding mechanism to permit the operation of the valve.

10. An automatically-operable valve having means for holding it against operation, the said means having an electrothermal device removably connected therewith for holding it intact, and means associated with the said electrothermal device and operable from a distance from the valve for removing the said device from the said holding means to permit the operation of the valve.

11. An automatically-operable valve having means for holding it against operation, the said means having a thermal element associated therewith for holding it intact, and means associated with the said thermal element and operable from a distance from the valve for removing the said thermal element from the said holding means to permit the operation of the valve.

12. An automatically-operable valve having an electrothermal device associated therewith for holding the valve against operation, and means associated with the said electrothermal device and operable from a distance from the valve for removing the said device from the valve mechanism to permit the operation of the valve.

13. An automatically-operable valve having a thermal element associated therewith for holding the valve against operation, and means associated with the said thermal element and operable from a distance from the valve for removing the said thermal element from the valve mechanism to permit the operation of the valve.

14. An automatically-operable valve having thermally-releasable means for holding the valve against operation, and means manually operable from a distance from the valve for displacing the said thermally-releasable means to permit the operation of the valve.

As inventor of the foregoing I hereunto subscribe my name, this 17th day of November, 1911.

CHARLES EDWARD HASTY.

Witnesses:
A. L. PAULSON,
A. P. KELLEY.

---

Copies of this patent may be obtained for five cents each, by addressing the "Commissioner of Patents, Washington, D. C."